Figure 1:
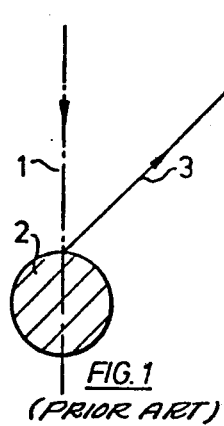

United States Patent van Valkenburg

[11] 4,120,591
[45] Oct. 17, 1978

[54] COLOR DETECTION DEVICE

[76] Inventor: Ludovicus Petrus Maria van Valkenburg, 's-Prinsensingel 17, Maasland, Netherlands

[21] Appl. No.: 746,626

[22] Filed: Dec. 1, 1976

[30] Foreign Application Priority Data

Dec. 3, 1975 [NL] Netherlands .................. 7514061

[51] Int. Cl.² ................. G01J 3/46; G01J 3/48
[52] U.S. Cl. ..................... 356/178; 356/195; 356/186
[58] Field of Search ............. 356/178, 179, 186, 195

[56] References Cited

U.S. PATENT DOCUMENTS

| Re. 29,031 | 11/1976 | Irving | 356/178 X |
|---|---|---|---|
| 3,306,156 | 2/1967 | Glasser | 356/178 X |
| 3,443,072 | 5/1969 | Mori | 356/178 X |

Primary Examiner—Vincent P. McGraw
Assistant Examiner—Rodney Bovernick
Attorney, Agent, or Firm—Cushman, Darby & Cushman

[57] ABSTRACT

Color detection apparatus wherein only light that has been diffuse-reflected, and has not been mirror-reflected, from the object whose color is to be detected is processed. Light from a source passes through a first polarizer before the light is incident on the object whose color is to be detected. Light reflected from this target object passes through a second polarizer which blocks all mirror-reflected light while permitting a portion of the diffuse-reflected light to pass. After passing through the second polarizer a portion of the light is directed onto a color filter after which the intensity of the transmitted light is detected. The intensity of the portion of light not applied to the color filter is also detected. The ratio of the output of the two detectors is a function of the color of the reflected light. The principal axis of the light incident on the target object is coincident with the principal axis of the reflected light that is to be processed, thus eliminating the need to accurately position the target object.

4 Claims, 5 Drawing Figures

FIG. 5

COLOR DETECTION DEVICE

The invention relates to a color detection device.

Devices are known for detecting color and are applied in, among others, fruit sorting machines. In this device the light strikes the object so that a substantial angle exists between the principal axis of the incident light and the axis normal to the surface of the object. Also, the light to be detected leaves the object at a substantial angle with respect to the normal axis. This is necessary in order to detect light resulting solely from diffuse-reflection, because this reflected light contains much more color information, than light resulting from mirror-reflection, that contains hardly any color information. The angle of incidence of the light from the source and the angle of leaving of the light to be detected must for this reason, be different. Because the angles between the axis normal to the surface of the object and both the axis of the incident light beam and the axis of the reflected light, to be detected are substantial, the point of intersection of the latter two axes is well defined. Thus the positioning of the surface of the object must be accurate. When this point of intersection, little or no light at all will reach the detector. The drawback of these severe demands with reference to the accuracy of the positioning of the surface in practice appears to be very large, particularly when fruit or other asymmetrical objects, are being sorted according to color. The device according to the invention lacks these drawbacks. In the present invention an object is at least partially illuminated by means of a light-source. A portion of the light diffuse-reflected from the object passes through a lens system to be divided into various beams. After having passed at least one color filter the beams are detected by various colored light intensity detectors, which emit electric currents proportional to the received colored light intensity, which can be further processed.

In order to detect only diffuse-reflected light, light from the source passes through a first polarization filter with a first polarization direction, before striking the object whose color is to be detected. A portion of the reflected light passes through a second polarization filter with a second polarization direction.

The first polarization direction of the first polarization filter is such, that the mirror reflected light has principally a polarization direction that differs preferably by 90°, from the second polarization direction of the second polarization filter.

In one embodiment of the present invention the axis, along which light principally propagates before striking the object, coincides with the axis along which the light to be detected principally propagates after reflection by the object.

The invention will now be described with reference to the drawings, in which FIG. 1 through 4 reflect the principle of the prior art and FIG. 5 an example of the device according to the invention.

In FIG. 1, white light along axis 1 from a light source is incident upon an object 2. Of the incident light, a portion reflects as a result of mirror-reflection back along axis 1, which in this case is normal to the surface of about2, and object 2, part scatters as a result of diffuse-reflection. Of the last mentioned part, the part that reflects in the direction of axis 3 is detected by a device installed along axis 3.

Figure 2:
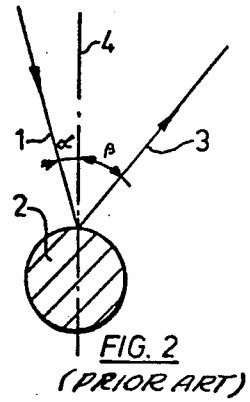

In FIG. 2, white light from a light source travels substantially parallel to axis 1, which axis makes an angle $\alpha$ axis normal to 4, the surface of object 2. A portion of the light, as a result of diffuse-reflection, is directed back to a detector device along axis 3 which makes an angle $\beta$ with normal axis 4, wherein angle $\beta$ must be unequal to angle $\alpha$ in order to avoid incidence on the detector device of mirror-reflected light.

Figure 3:
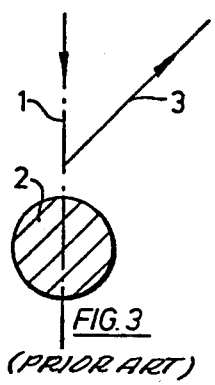
Figure 4:
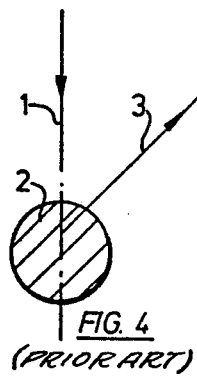

FIGS. 3 and 4 indicate the importance in the case of FIGS. 1 and 2 of the placement of object 2 is with respect to the point of intersection of axes 1 and 3. If the object plane lies under the point of intersection of axes 1 and 3, as illustrated in FIG. 3, or if the object plane lies above the point of intersection of axes 1 and 3, as illustrated in FIG. 4, a detection device on axis 3 will not receive light reflected from the surface of object 2. In both cases the detection device will receive too little or no light at all.

Because the light beam, incident upon object 2, in fact will be a somewhat diverging beam, the angle between axis 1, the principle axis of light propagation, and axis 3, the principle axis along which light is detected, must not be too small in order to eliminate the detection of mirror-reflected light. As this angle increases the point of intersection of axis 1 and 3 becomes better defined, and, therefore it becomes more difficult, in practice, to accurately adjust the location of the plane of reflection on object 2 to include the point of intersection. Moreover, when object 2 has a bent surface, part of the light received by the detection device will be a result of mirror-reflection.

Figure 5:
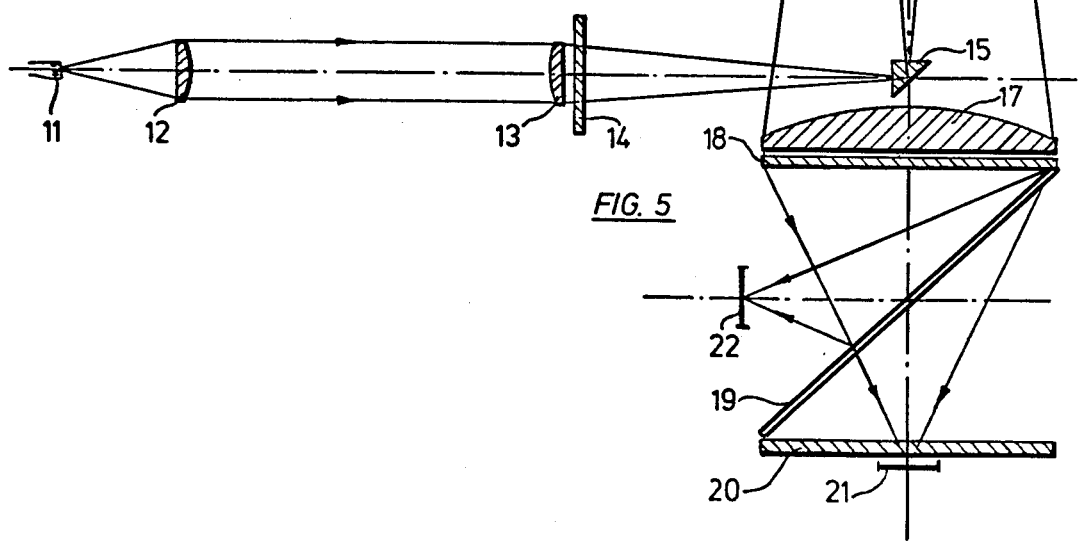

FIG. 5 is an illustration of a device according to the present invention. White light from light source 11 is transmitted via lens systems 12 and 13 through polarization filter 14. The beam then reflects off of a plane of prism 15, and, as a somewhat diverging beam, is incident on a plane of object 16, the color of which is to be detected. The light reflected off of object 16, both as a consequence of mirror-reflection and as a consequence of diffuse reflection, propagates along an axis coincident with the before-mentioned incident beam axis, and is incident upon lens 17. Behind lens 17 is a second polarization filter 18. At an angle of 45° to polarization filter 18 is dividing mirror 19 mounted behind polarization filter 18 so as to transmit a part of the incident light which is detected via optical color filter 20 by detector 21, and to reflect the remaining light toward detector 22.

The polarization direction of the light having passed through polarization filter 14, is such that the part thereof that, returns to lens 17 as a result of mirror-reflection and therefore, retains its polarization direction, is arrested by second polarization filter 18, because the polarization direction thereof differs by 90° from the polarization direction of the mirror-reflection light reflected off an object 16. Only the part of the light that returns in the direction of the lens 17 as a consequence of diffuse-reflection, is able to pass through second polarization filter 18, since as a consequence of the diffuse reflection, this light is no longer polarized in the original direction. The part transmitted through dividing mirror 19 contains the desired color information. Since the axis of light incident on object 16 coincides with the axis of light reflected toward detector 21 the location of the plane of impact of the light reflected from prism 15 object 16 is not critical so that object 16 can even move between wide limits. In the shape of object 16 is not critical, considerably enlarging the number of objects capable of undergoing color detection.

By use of dividing mirror 19 and optical color filter 20 before detectors 21 and 22, the frequency of light eliciting maximum sensitivity for detector 21 may be made different from the frequency of maximum sensitivity for detector 22. Detectors 21 and 22, transform incident radiation into electric currents proportional to the intensity of the radiation. The voltages resulting therefrom are divided one by another, from which an electric voltage results, having a magnitude dependent on the color of object 16. By determination of the magnitude of the ratio of the output voltages of detectors 21 and 22, the result is independent of the total quantity of light reaching the detector so that the result solely reflects the spectral composition of the light flux resulting in a detection device with a large dynamic range. The electric voltage representative of the ratio of detector outputs can be supplied to an electronic signal conversion unit, containing, for example threshold devices, in which the supplied voltage is compared with a number of adjustable voltages generated in the signal conversion unit. This a broad spectrum ca be can in a number of smaller spectral fields, the frequency limits of which are adjustable in accordance with the adjustable voltages generated in the signal conversion unit. When a voltage, generated by the detection devices, is outside of these values, a relay on the signal conversion unit is excited, which can for example control solenoids, which operate mechanical switching systems.

The color detection device according to the invention can find application for example in color sorting devices for a large number of objects, such as fruits, dye-stuffs, plastics and many others.

I claim:

1. A color detection device for detecting the color of an object comprising:
   a source of light;
   first polarizing means for polarizing the light from said source in a first direction;
   first directing means for directing said light onto said object;
   second polarizing means oriented to block light that has been mirror-reflected from said object and pass only a part of the light that has been diffuse-reflected from said object;
   second directing means for directing said portion of light to said second polarizing means;
   a dividing mirror for dividing the light passing through said second polarizing means into a plurality of beams;
   color filter means through which at least one of said beams pass; and
   light detection means for producing signals proportional to the intensity of each of said beams.

2. Device according to claim 1, wherein the axis along which the light incident on said object principally propagates, coincides with the axis along which the light to be detected principally propagates after reflection by said object.

3. Device according to claim 2, wherein the axis, along which the light, emitted by said source, propagates before said first directing means, is perpendicular with respect to the axis along which the light propagates behind said first directing means.

4. Device according to claim 1 further comprising means for determining the ratios of magnitudes of groups of two of said signals.

* * * * *